(12) United States Patent
Yin

(10) Patent No.: US 12,289,169 B2
(45) Date of Patent: Apr. 29, 2025

(54) URLLC PHYSICAL UPLINK CONTROL CHANNEL (PUCCH) WITH REPETITIONS

(71) Applicant: SHARP KABUSHIKI KAISHA, Sakai (JP)

(72) Inventor: Zhanping Yin, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 376 days.

(21) Appl. No.: 17/764,745

(22) PCT Filed: Sep. 30, 2020

(86) PCT No.: PCT/JP2020/037155
§ 371 (c)(1),
(2) Date: Mar. 29, 2022

(87) PCT Pub. No.: WO2021/066015
PCT Pub. Date: Apr. 8, 2021

(65) Prior Publication Data
US 2022/0353024 A1 Nov. 3, 2022

Related U.S. Application Data

(60) Provisional application No. 62/910,169, filed on Oct. 3, 2019.

(51) Int. Cl.
*H04L 1/1829* (2023.01)
*H04L 1/08* (2006.01)
(Continued)

(52) U.S. Cl.
CPC .............. *H04L 1/1861* (2013.01); *H04L 1/08* (2013.01); *H04L 5/0053* (2013.01);
(Continued)

(58) Field of Classification Search
CPC ....... H04L 1/1861; H04L 1/08; H04L 5/0053; H04L 5/0055; H04W 72/0446; H04W 72/1268; H04W 72/21
See application file for complete search history.

(56) References Cited

U.S. PATENT DOCUMENTS

2019/0165895 A1   5/2019  Kim
2020/0053766 A1*  2/2020  Chien .................. H04L 5/0053
(Continued)

FOREIGN PATENT DOCUMENTS

KR          20190060657 A      6/2019

OTHER PUBLICATIONS

Panasonic, Discussion on UCI enhancement for URLLC; 3rd Generation Partnership Project (3GPP), R1-1912748, Nov. 18, 2019 (Year: 2019).*
(Continued)

*Primary Examiner* — Abdullahi Ahmed
(74) *Attorney, Agent, or Firm* — ScienBiziP, P.C.

(57) ABSTRACT

A user equipment (UE) is described. The UE includes a processor configured to determine a subslot structure for physical uplink control channel (PUCCH) repetition for ultra-reliable low-latency communication (URLLC) transmissions. The UE also includes transmitting circuitry configured to transmit the PUCCH repetition for the URLLC transmissions based on the subslot structure.

9 Claims, 14 Drawing Sheets

(51) Int. Cl.
*H04L 5/00* (2006.01)
*H04W 72/0446* (2023.01)
*H04W 72/1268* (2023.01)
*H04W 72/21* (2023.01)

(52) U.S. Cl.
CPC ... *H04W 72/0446* (2013.01); *H04W 72/1268* (2013.01); *H04W 72/21* (2023.01)

(56) References Cited

U.S. PATENT DOCUMENTS

| | | | |
|---|---|---|---|
| 2020/0205150 A1* | 6/2020 | Cheng | H04W 72/21 |
| 2021/0058922 A1* | 2/2021 | Han | H04L 5/0055 |
| 2021/0168833 A1* | 6/2021 | Yang | H04L 5/0053 |
| 2022/0085956 A1* | 3/2022 | Yin | H04L 7/06 |
| 2022/0150026 A1* | 5/2022 | Yin | H04L 5/0044 |
| 2022/0264623 A1* | 8/2022 | Yin | H04W 72/56 |
| 2022/0271874 A1* | 8/2022 | Behravan | H04L 5/0051 |
| 2022/0303063 A1* | 9/2022 | Mu | H04L 5/0055 |

OTHER PUBLICATIONS

NTT Docomo, Inc., "UCI enhancements for URLLC", R1-1909194, 3GPP TSG RAN WG1 #98, Prague, CZ, Aug. 26-30, 2019.
Xiaomi, "Discussion on UCI enhancement for URLLC", R1-1910302, 3GPP TSG RAN WG1 #98b, Chongqing, China, Oct. 14-20, 2019.

* cited by examiner

URLLC PHYSICAL UPLINK CONTROL CHANNEL (PUCCH) WITH REPETITIONS

CROSS REFERENCE

This Nonprovisional application claims priority under 35 U.S.C. § 119 on provisional Application No. 62/910,169 on Oct. 3, 2019, the entire contents of which are hereby incorporated by reference.

TECHNICAL FIELD

The present disclosure relates generally to communication systems. More specifically, the present disclosure relates to ultra-reliable low-latency communication (URLLC) physical uplink control channel (PUCCH) with repetitions.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to determine a subslot structure for physical uplink control channel (PUCCH) repetition for ultra-reliable low-latency communication (URLLC) transmissions; and transmitting circuitry configured to transmit the PUCCH repetition for the URLLC transmissions based on the subslot structure.

In one example, a base station (gNB), comprising: a processor configured to determine a subslot structure for physical uplink control channel (PUCCH) repetition for ultra-reliable low-latency communication (URLLC) transmissions; and receiving circuitry configured to receive the PUCCH repetition for the URLLC transmissions based on the subslot structure.

In one example, a method by a user equipment (UE), comprising: determining a subslot structure for physical uplink control channel (PUCCH) repetition for ultra-reliable low-latency communication (URLLC) transmissions; and transmitting the PUCCH repetition for the URLLC transmissions based on the subslot structure.

In one example, a method by a base station (gNB), comprising: determining a subslot structure for physical uplink control channel (PUCCH) repetition for ultra-reliable low-latency communication (URLLC) transmissions; and receiving the PUCCH repetition for the URLLC transmissions based on the subslot structure.

DESCRIPTION OF EMBODIMENTS

Figure 1:
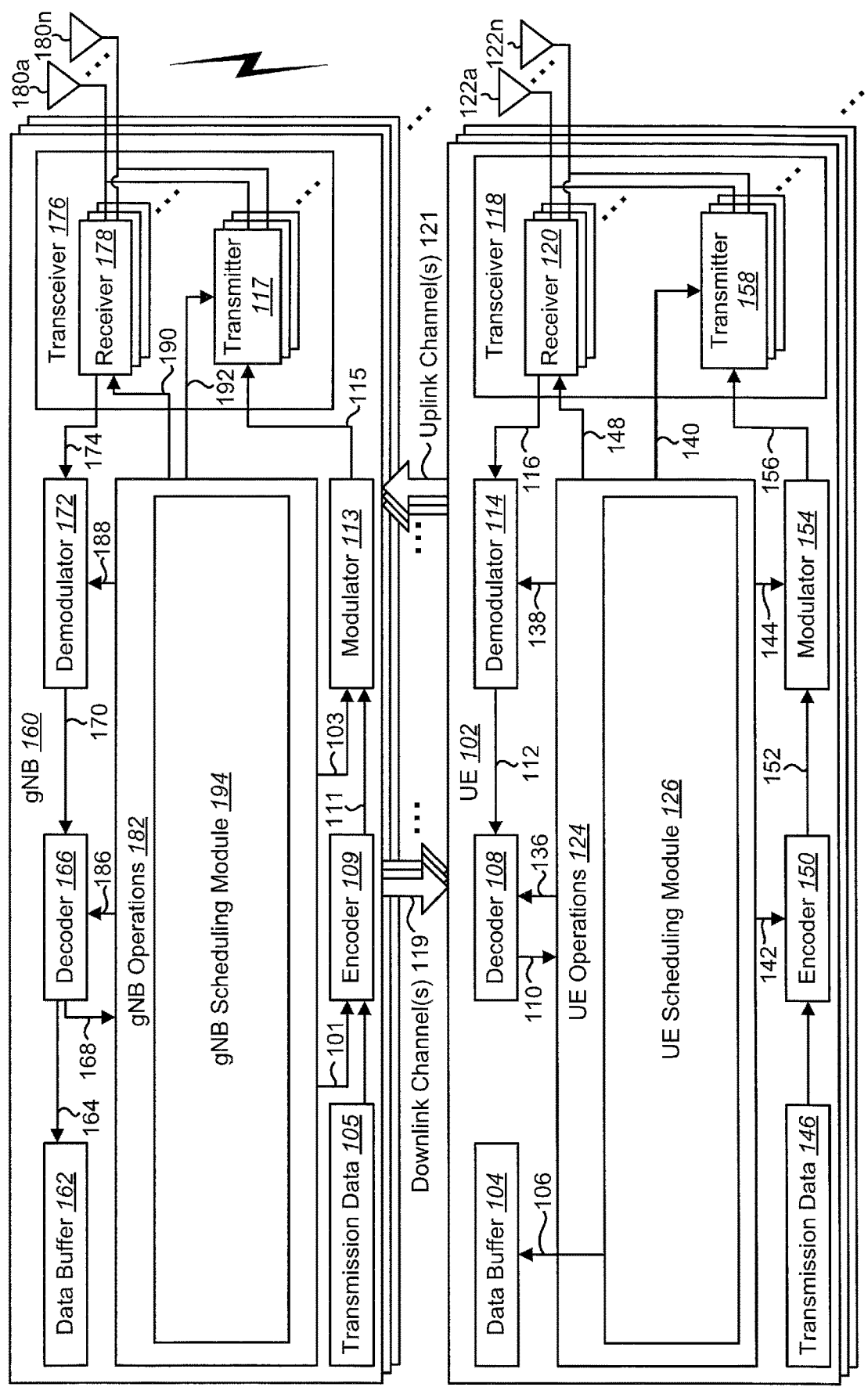
FIG. 1 is a block diagram illustrating one implementation of one or more gNBs and one or more UEs in which systems and methods for ultra-reliable low-latency communication (URLLC) physical uplink control channel (PUCCH) with repetitions may be implemented.

A user equipment (UE) is described. The UE includes a processor configured to determine a subslot structure for physical uplink control channel (PUCCH) repetition for ultra-reliable low-latency communication (URLLC) transmissions. The UE also includes transmitting circuitry configured to transmit the PUCCH repetition for the URLLC transmissions based on the subslot structure.

The PUCCH repetition may be configured for format 0, format 2, format 1, format 3, or format 4. The PUCCH repetition may be configured for the frequency domain with continuous resource element (RE) allocation mapping. The PUCCH repetition may be configured for the frequency domain with distributed resource element (RE) allocation mapping.

The PUCCH repetition may be configured for the time domain. The PUCCH repetition within a subslot may be supported and PUCCH transmission across a subslot boundary may not be allowed. The PUCCH repetition within a subslot may be supported, a PUCCH transmission across a subslot boundary may be allowed within a slot, and PUCCH transmission across a slot boundary may not be supported. PUCCH repetition within a subslot may not be supported and one subslot-based PUCCH transmission may be transmitted in a subslot, and the PUCCH repetition may be performed by PUCCH transmission in multiple subslots.

If a subslot-based PUCCH repetition is scheduled to collide with another PUCCH in a subslot, the processor may be configured to compare uplink control information (UCI) priority. A PUCCH carrying a first UCI with higher priority may be transmitted and another PUCCH may be dropped. If a subslot-based PUCCH repetition is scheduled to collide with another PUCCH in a subslot with a same uplink control information (UCI) priority, a PUCCH that starts earlier may be transmitted and another PUCCH may be dropped.

A base station (gNB) is also described. The gNB includes a processor configured to determine a subslot structure for physical uplink control channel (PUCCH) repetition for ultra-reliable low-latency communication (URLLC) transmissions. The gNB also includes receiving circuitry configured to receive the PUCCH repetition for the URLLC transmissions based on the subslot structure.

The PUCCH repetition may be configured for format 0, format 2, format 1, format 3, or format 4. The PUCCH repetition may be configured for the frequency domain with continuous resource element (RE) allocation mapping. The PUCCH repetition may be configured for the frequency domain with distributed resource element (RE) allocation mapping.

The PUCCH repetition may be configured for the time domain. The PUCCH repetition within a subslot may be supported and PUCCH transmission across a subslot boundary may not be allowed. The PUCCH repetition within a subslot may be supported, a PUCCH transmission across a subslot boundary may be allowed within a slot, and PUCCH transmission across a slot boundary may not be supported. PUCCH repetition within a subslot may not be supported and one subslot-based PUCCH transmission may be transmitted in a subslot, and the PUCCH repetition may be performed by PUCCH transmission in multiple subslots.

If a subslot-based PUCCH repetition is scheduled to collide with another PUCCH in a subslot, the processor may be configured to compare uplink control information (UCI) priority. A PUCCH carrying a first UCI with higher priority may be transmitted and another PUCCH may be dropped. If a subslot-based PUCCH repetition is scheduled to collide with another PUCCH in a subslot with a same uplink control information (UCI) priority, a PUCCH that starts earlier may be transmitted and another PUCCH may be dropped.

A method by a user equipment (UE) is also described. The method includes determining a subslot structure for physical uplink control channel (PUCCH) repetition for ultra-reliable low-latency communication (URLLC) transmissions. The method also includes transmitting the PUCCH repetition for the URLLC transmissions based on the subslot structure.

A method by a base station (gNB) is also described. The method includes determining a subslot structure for physical uplink control channel (PUCCH) repetition for ultra-reliable low-latency communication (URLLC) transmissions. The method also includes receiving the PUCCH repetition for the URLLC transmissions based on the subslot structure.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE-decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In 5G NR, different services can be supported with different quality of service (QoS) requirements (e.g., reliability and delay tolerance). For example, eMBB may be targeted for high data rate, and URLLC is for ultra-reliability and low latency. To support ultra-low latency, more than one HARQ-ACK feedback in a slot may be configured for URLLC services. Examples of subslot structures for PUCCH repetitions for URLLC are described herein. In NR, two or more HARQ-ACK codebooks may be simultaneously constructed for different service types. The PUCCH for URLLC HARQ-ACK may be used to transmit HARQ-ACK at a subslot level. In some examples, the PUCCH for URLLC HARQ-ACK may be enhanced with ultra reliability, (e.g., with a block error ration (BLER) of $10^{-6}$ instead of $a0^{-2}$). Additionally, aspects of URLLC PUCCH enhancement with different PUCCH formats are described herein, which may include support of PUCCH repetitions in the frequency domain and/or time domain for URLLC with slot level and/or subslot level structures.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for URLLC PUCCH with repetitions may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

In some examples, the UE scheduling module 126 may be utilized to perform URLLC PUCCH communications with repetitions as described herein. The UE 102 may be configured with a subslot structure for PUCCH repetition. Different subslot structures may be specified, for example, a 2-symbol structure, a 3 and 4 symbol structure and/or a 7-symbol structure, etc. In some examples, the UE 102 may be configured with higher layer signaling for a subslot structure for PUCCH repetition.

In some approaches, the subslot structure may be configured for the UE 102. Additionally or alternatively, URLLC HARQ-ACK PUCCH resources may be configured at a subslot level. For example, the PUCCH format may be enhanced to provide target (e.g., improved) reliability. Besides the enhancements on a single PUCCH resource, a PUCCH for URLLC may be configured with repetitions to enhance the PUCCH reliability. Some approaches for PUCCH repetition for URLLC are described herein.

For subslot-based PUCCH, PUCCH repetition may be supported to improve PUCCH reliability. For example, repetition may be supported for PUCCH formats 0 and 2 and PUCCH formats 1, 3, and 4. Some approaches may only allow PUCCH repetition for formats 1, 3, and 4. In accordance with some examples of the systems and methods disclosed herein, subslot-based PUCCH repetition may be supported for all PUCCH formats (e.g., formats 0, 2, 1, 3, and 4).

In some examples, repetition may be configured for the frequency domain with continuous and/or distributed RE allocation mapping. For instance, PUCCH repetition may be configured and performed in the frequency domain. Accordingly, a PUCCH format may be used with a repetition factor. For example, a PUCCH resource may be repeated in the frequency domain based on the configuration. Continuous and/or distributed mapping may be supported for frequency domain repetition.

In some examples, repetition may be configured for the time domain. For instance, PUCCH repetition may be configured and performed in the time domain. In some approaches, PUCCH repetition may be performed within a subslot and/or a slot. In some approaches, the PUCCH repetition may be transmitted across multiple subslots and/or slots.

In a first case of time domain repetition, PUCCH repetition within a subslot may be supported. A PUCCH transmission across a subslot boundary may not be allowed in some examples.

In a second case of time domain repetition, PUCCH repetition within a subslot may be supported. PUCCH transmission across a subslot boundary may be allowed within a slot. PUCCH transmission across a slot boundary may not be supported in some examples.

In a third case of time domain repetition, PUCCH repetition within a subslot may not be supported. One subslot-based PUCCH may be transmitted in a subslot. PUCCH repetition may be performed by PUCCH transmissions in multiple subslots in some examples.

If a subslot-based PUCCH repetition may collide with another PUCCH in a subslot, a UCI priority may be compared. The PUCCH carrying the UCI with higher priority may be transmitted. The other PUCCH may be dropped. In a case of same UCI priority, the PUCCH that starts earlier (e.g., the ongoing PUCCH with repetition) may be transmitted. The other PUCCH may be dropped.

Aspects of PUCCH formats in NR are described herein. PUCCH may be used to report important uplink control information (UCI), which includes HARQ-ACK, SR, channel state information (CSI), etc. While NR release-15 is designed mainly for enhanced mobile broadband (eMBB), several physical uplink control channel (PUCCH) formats are specified for different number of bits, as given below. The physical uplink control channel supports multiple formats as shown in Table 1. In case frequency hopping is configured for PUCCH format 1, 3, or 4, the number of symbols in the first hop is given by $\lfloor N_{symb}^{PUCCH}/2 \rfloor$ where $N_{symb}^{PUCCH}$ is the length of the PUCCH transmission in OFDM symbols.

TABLE 1

| PUCCH format | Length in OFDM symbols $N_{symb}^{PUCCH}$ | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

Examples of HARQ-ACK feedback PUCCH allocations for URLLC are described herein. The UE 102 may be configured with a separate PUCCH resource set for enhanced PUCCH formats from the "normal" PUCCH format (i.e., the PUCCH resource sets for URLLC traffic may be configured independently and separately from eMBB PUCCH resource sets). The PUCCH resource for URLLC may be configured with different parameters and/or with some different fields from that of eMBB resources.

In NR, multiple PUCCH resource sets may be configured for different payload sizes. In each PUCCH resource set, up to 16 PUCCH resources can be configured. If the number of resources is more than 4, subsets are formed. In NR, for a PUCCH reporting, the PUCCH resource set may first be determined based on the UCI payload size. The ARI field may indicate the PUCCH resource subset in a PUCCH resource set. If there are more than 1 PUCCH resource in each subset, the PUCCH resource for UCI reporting may be determined implicitly based on CCE index of the scheduling DCI. Namely, the PUCCH resource subset(s) for URLLC or eMBB may be indicated by using the ARI field. Also, the PUCCH resource(s) for URLLC or eMBB may be determined based on CCE index of the scheduling DCI (e.g., the CCE index of PDCCH scheduling PDSCH transmission).

URLLC traffic requires ultra-reliability and low latency. The HARQ-ACK for URLLC packet may be supported to provide the required reliability. Furthermore, the HARQ-ACK feedback should be reported immediately after a URLLC transmission.

To provide target (e.g., improved) reliability for DL URLLC transmission, PUCCH resources may need to be allocated to allow PDSCH retransmissions. Due to high reliability and low latency requirements, to support retransmission of URLLC PDSCH, one or more HARQ-ACK feedback needs to be reported within a subframe, and more than one HARQ-ACK reporting PUCCH resources may need to be configured in a subframe or a slot.

Figure 2:
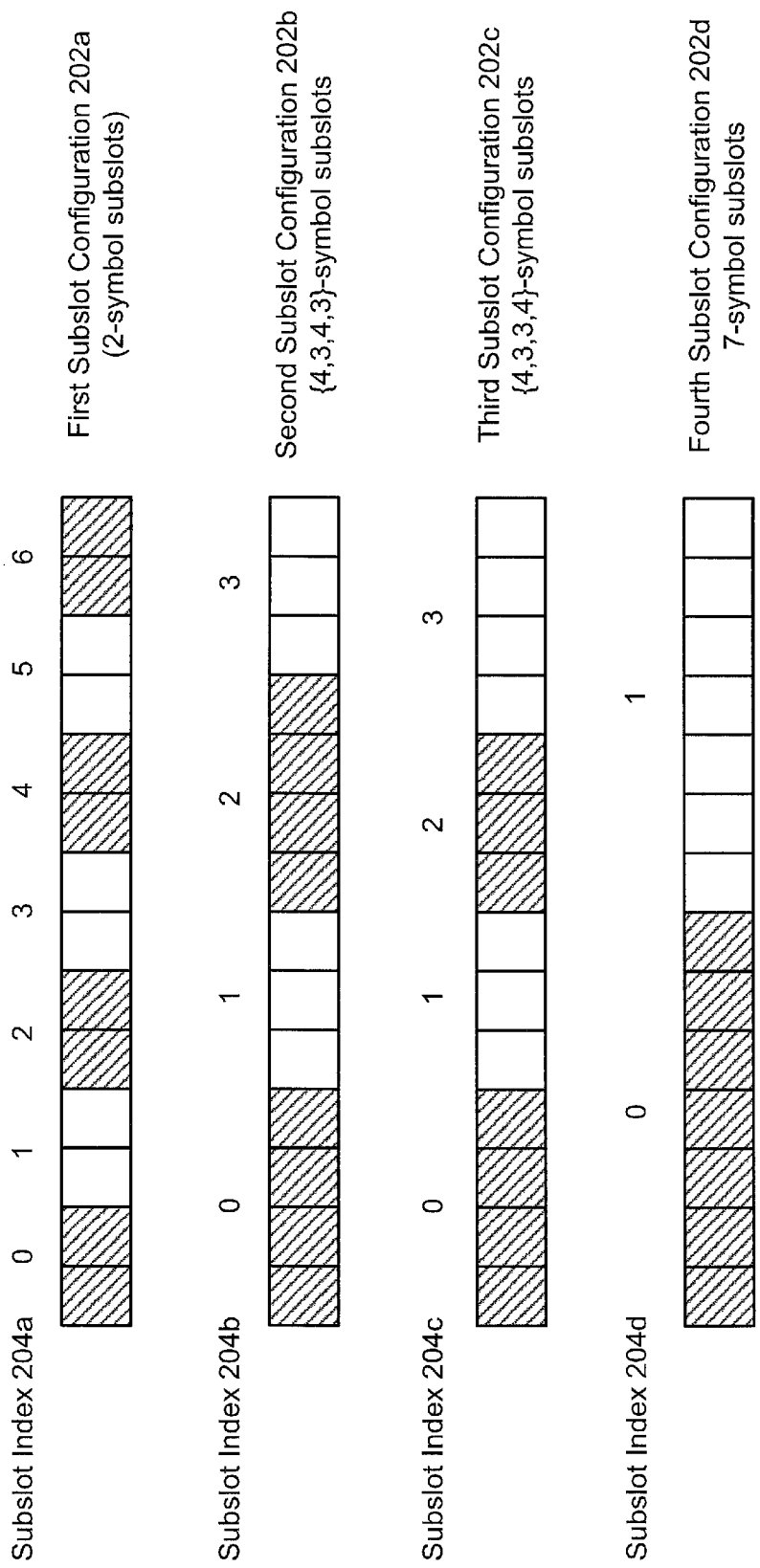
FIG. 2 illustrates examples of subslot structures for URLLC PUCCH allocation.

In NR, subslot configuration for PUCCH for HARQ-ACK reporting can be separately configured from PDSCH and PUSCH scheduling of a different service type (e.g., URLLC). For UL subslot configuration for HARQ-ACK feedback on PUCCH, different subslot configurations may be specified for NR. FIG. 2 illustrates examples of subslot structures for URLLC PUCCH allocation.

In one case, the PUCCH resources can be configured in each subslot of a configured subslot structure. Multiple sets of PUCCH resources can be configured in each subslot. Each PUCCH resource set may be configured for a payload range. Each resource set may contain PUCCH resources with the same or different formats, with the same or different starting positions in a subslot. A single PUCCH resource may not cross over a subslot boundary, in some examples.

Figure 3:
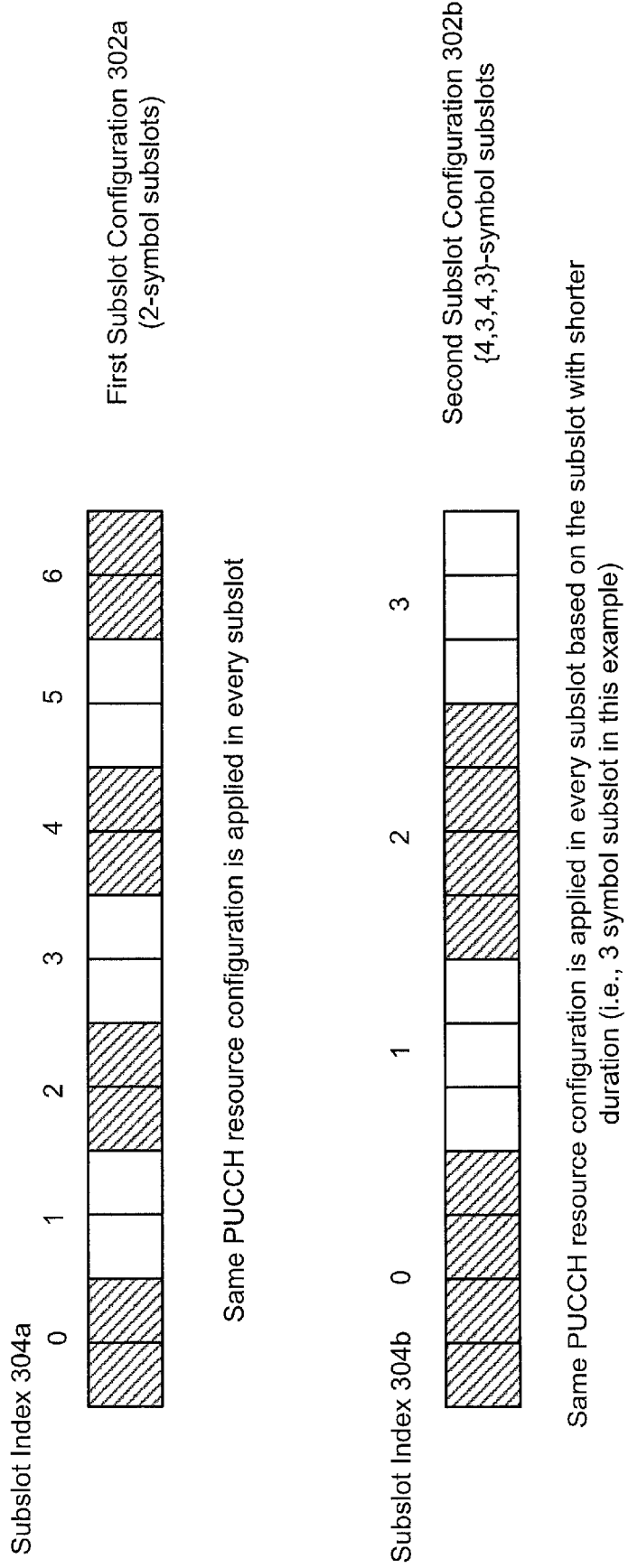
FIG. 3 illustrates examples of PUCCH resource configuration in each subslot.

In some examples, the same PUCCH configuration can be applied to all subslots, as shown in FIG. 3. In the case of the different duration for the subslots (e.g., in the case of 3 and 4 symbol subslot structure), the same PUCCH configuration may be determined based on the subslot with a shorter duration.

In some examples of a subslot structure, seven 2-symbol subslots and two 7-symbol subslots may be supported in NR. A 4-symbol and 3-symbol structure is another example of a subslot structure, which may be beneficial in some cases. In some approaches, the UE 102 may be configured with multiple subslot structures, and different PUCCH resources sets may be configured that follow different subslot structure configurations.

To support different service types, two or more HARQ-ACK codebooks may be constructed (e.g., concurrently constructed in partially overlapping time ranges or simultaneously constructed). For URLLC service, a subslot-based PUCCH may be configured for subslot-based HARQ-ACK feedback. In some examples, the same PUCCH resource can be configured in all subslots with a configured subslot structure.

In some approaches, a PUCCH resource may cross subslot boundaries. In some examples of NR, a single PUCCH resource may not cross a slot boundary. However, different approaches may be taken based on whether a PUCCH resource configured for subslot-based HARQ-ACK can cross subslot boundaries within a slot.

In approaches where a PUCCH resource may cross one or more subslot boundaries, depending on the location of a PUCCH resource, the duration of a PUCCH resource can be different. For example, a PUCCH resource in an earlier subslot may have longer duration and cross a subslot boundary within the same slot. A PUCCH resource in the last subslot in a slot may be shorter and confined in the given subslot, for instance.

In some examples, different PUCCH resource durations may be configured in different subslots based on the subslot position in a slot. Some configurations may be more complicated, with a small benefit or no benefit. In such cases, the PUCCH resources and performances in different subslots may be different, and the subslot structure may not be kept for PUCCH resource configuration. Accordingly, it may be beneficial to limit a single PUCCH resource within a subslot. Thus, for subslot-based PUCCH resource allocation, a single PUCCH resource may not cross a subslot boundary in some approaches. To achieve similar results as PUCCH duration lengthens, PUCCH repetition may be configured across subslots to avoid different PUCCH configurations in different subslots based on the locations of the subslot in a slot.

Examples of use cases of subslot-based PUCCH repetition are described herein. To achieve a target of longer duration and reliability for a PUCCH resource across subslot boundaries, the subslot-based PUCCH repetition for URLLC may be considered. Thus, besides the enhancements for a single PUCCH resource configuration, enhancements on PUCCH repetition can also be supported.

Figure 4:
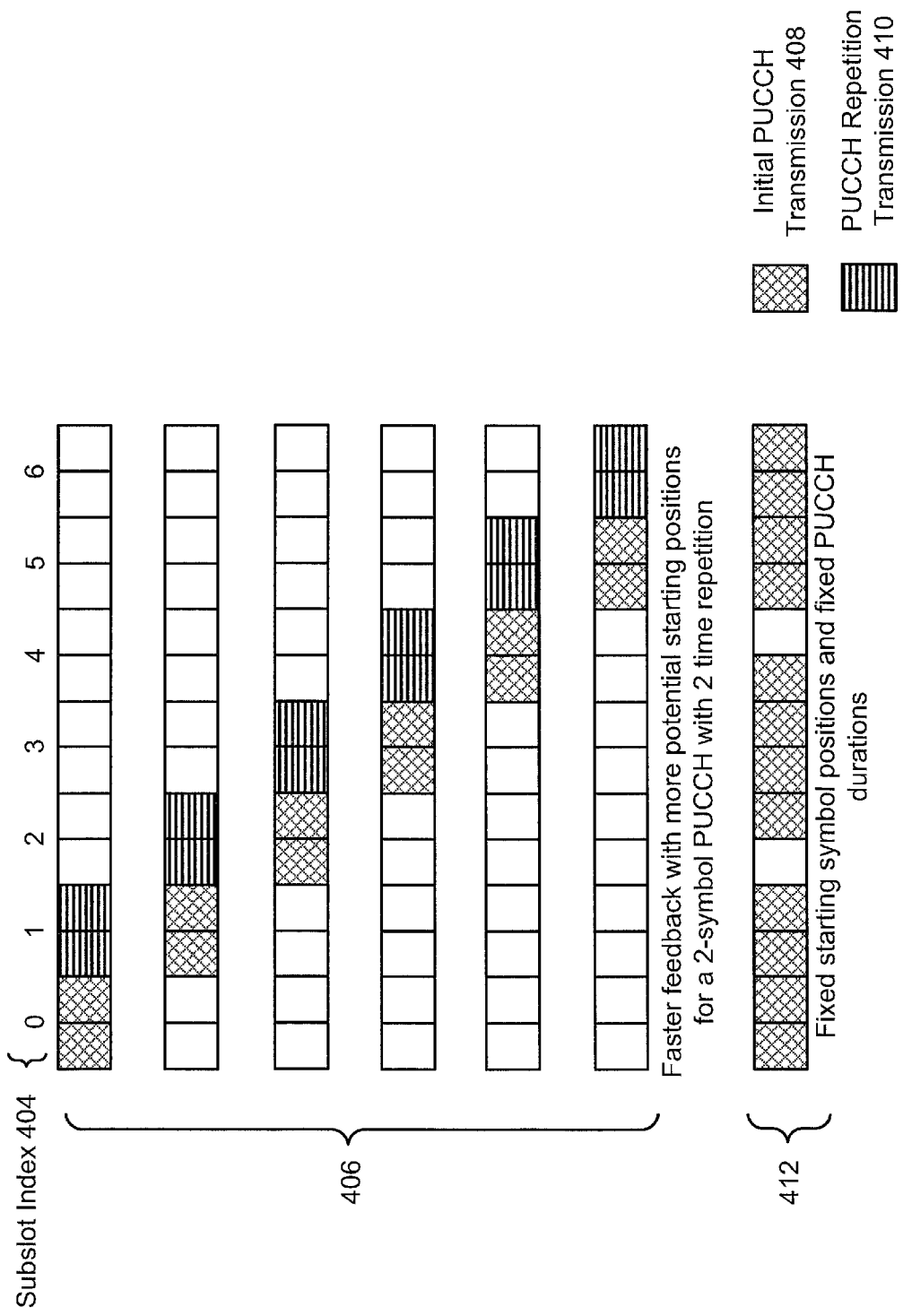
FIG. 4 is a diagram illustrating examples of PUCCH repetition with a subslot structure.

There are several beneficial use cases for PUCCH repetition. In some examples, multiple PUCCH transmission may provide higher reliability with time diversity over a single PUCCH transmission of an existing or an enhanced PUCCH format. A PUCCH repetition may provide fast feedback with finer granularity. For example, the gNB 160 may start decoding the PUCCH earlier, and may get the feedback before all PUCCH repetitions are completed. The UE 102 may start PUCCH feedback earlier compared with a fixed starting location with no PUCCH resource overlapping. FIG. 4 illustrates examples with a 2-symbol subslot structure.

Some approaches for enhancement of PUCCH repetition for subslot based PUCCH are described herein. To provide higher reliability for a subslot-based PUCCH for URLLC, besides enhanced PUCCH formats, PUCCH repetition can achieve the same performance gain.

Some approaches for frequency domain repetition are described herein. In some approaches, the PUCCH repetition may be configured and performed in the frequency domain. For example, a PUCCH format (e.g., a legacy PUCCH format) with a repetition factor may be configured for URLLC services. For instance, an existing method may be used to determine the initial PUCCH resource. A repetition factor may determine the number of repetitions for the PUCCH in the frequency domain. Utilizing a repetition factor may achieve the same results as an enhanced PUCCH resource with multiple physical resource blocks (PRBs) (e.g. for PUCCH format 0 and PUCCH format 1).

In some examples, two or more resource allocation approaches may be supported. In one approach, PUCCH repetition may be performed in continuous RBs from the initial PUCCH transmission. In another approach, PUCCH repetition is performed in distributed resource blocks (RBs) in the bandwidth part (BWP). Some patterns may be defined and indicated for the RB resource allocation.

Some approaches for time domain repetition are described herein. To provide improved (e.g., higher) reliability for a PUCCH for URLLC HARQ-ACK, time domain repetition may be supported or enhanced for PUCCH of URLLC in a slot and/or a subslot.

In some approaches, PUCCH repetition is supported only for long PUCCH format 1, format 3, and format 4. The PUCCH repetition is performed at slot level. The same PUCCH resource configuration is applied in each slot, i.e., the PUCCH in each slot has the same starting symbol, duration, and number of PRBs, etc. The number of PUCCH repetitions is configured by RRC signaling with the parameter nrofSlots. When PUCCH repetition is configured, the frequency hopping can be further configured. If inter-slot frequency hopping is enabled, the frequency hopping is performed at each slot in accordance with Listing 1.

Listing 1

| PUCCH-FormatConfig ::= | SEQUENCE { |
|---|---|
| ... | |
| interslotFrequencyHopping | ENUMERATED {enabled} |
| nrofSlots | ENUMERATED {n2,n4,n8} |
| ... | |

In some different approaches to PUCCH repetition, the URLLC subslot-based PUCCH repetition may support short PUCCH format 0 and format 2, in addition to or alternatively from long PUCCH format 1, format 3 and format 4.

The PUCCH repetition may allow multiple PUCCH transmissions of the same UCI report.

In some approaches to PUCCH repetition, only one PUCCH transmission is allowed in a slot, and repetition is performed by PUCCH transmissions in multiple slots. For URLLC subslot-based PUCCH repetition, PUCCH repetition within a slot and even repetition within a subslot may be supported.

Since more than one PUCCH for HARQ-ACK reporting may be supported in a slot for URLLC, PUCCH repetition may be supported within a slot. If use of subslots is configured, PUCCH repetition may also be supported within a subslot and/or within a slot. One or more cases may be implemented for subslot based PUCCH repetition.

In a first case, PUCCH repetition within a subslot is supported. A PUCCH transmission across a subslot boundary may not be allowed. For example, is a subslot structure is configured and a PUCCH resource is configured in a subslot, PUCCH repetition may be performed within a subslot. In this case, more than one PUCCH transmissions may happen in a subslot. Examples of approaches of the first case are given in connection with FIG. 6.

In a second case, PUCCH repetition within a subslot is supported. PUCCH transmission across a subslot boundary may be allowed within a slot, but PUCCH transmission across a slot boundary may not be supported. In the second case, as an exception, PUCCH transmission across a subslot boundary may be allowed for PUCCH repetition. The initial PUCCH transmission may still be confined within a subslot. Accordingly, crossing a subslot boundary may not be allowed for a PUCCH configuration, and PUCCH transmission across a subslot boundary may be allowed for a PUCCH transmission during repetition. PUCCH transmission across slot boundary may not be allowed. Accordingly, if a subslot boundary is also a slot boundary, PUCCH transmission across the subslot (and slot) boundary may not be allowed. Examples of approaches of the second case are given in connection with FIG. 7 and FIG. 8.

In a third case, PUCCH repetition within a subslot may not be supported. For example, one subslot-based PUCCH may be transmitted in a subslot, and PUCCH repetition may be performed by PUCCH transmissions in one or more subslots. For instance, a single PUCCH transmission may be allowed within a subslot, and multiple PUCCH transmissions may be performed in multiple subslots, with one PUCCH transmission in each subslot. If a subslot does not have enough UL symbols available for the configured PUCCH duration, the PUCCH may not be transmitted, and the PUCCH repetition may be performed in the next available subslot. Examples of approaches of the third case are given in connection with FIG. 9.

PUCCH repetition and collision with PUCCH for the same UCI type are discussed as follows. If a slot is configured with multiple subslots, the PUCCH resources may be configured in all subslots or a subset of subslots.

In one case, the PUCCH repetition may not be extended to the starting symbol of the next configured PUCCH resource for the same UCI type in a later subslot. This may avoid potential overlapping of PUCCH transmissions for HARQ-ACK reporting. If a PUCCH resource is configured in every subslot, the PUCCH repetition may be limited within the same subslot.

In another case, PUCCH repetition may be extended beyond the starting symbol of the next configured PUCCH resource for the same UCI type in a later subslot. The configured PUCCH transmission in the later subslot may not be expected to be transmitted for the same UCI type before the ongoing multiple PUCCH transmission is completed. This may provide a cascade mode of PUCCH repetition with earlier reporting by smaller granularity of PUCCH starting positions in a slot.

Yet in another case, PUCCH repetition may be extended beyond the starting symbol of the next configured PUCCH resource for the same UCI type in a later subslot. The configured PUCCH transmission in the later subslot for the same UCI type may be dropped and not transmitted for the same UCI type before the ongoing multiple PUCCH transmission is completed.

If a PUCCH repetition may collide with another PUCCH in a subslot, the UCI priority may be compared, and the PUCCH carrying the UCI with higher priority may be transmitted, and the other PUCCH may be dropped. In a case of same UCI priority, the PUCCH that starts earlier (e.g., the ongoing PUCCH with repetition) may be transmitted, and the other PUCCH may be dropped.

In some examples, if the URLLC PUCCH uses a higher SCS setting than eMBB traffic, the symbol duration of URLLC PUCCH becomes shorter than that of the eMBB. Time domain PUCCH repetition may be configured to align the symbol boundaries between eMBB and URLLC symbols on the same carrier or band or bandwidth part. Therefore, the PUCCH for URLLC may be repeated in the time domain to fit the symbol duration of the reference numerology defined by eMBB services. This may avoid partial symbol overlapping between transmissions with different numerologies.

For example, if 15 kilohertz (kHz) subcarrier spacing (SCS) (e.g., first SCS) is used as reference numerology for eMBB, and URLLC uses a 60 kHz subcarrier spacing (e.g., second SCS), four 60 kHz SCS symbols may be transmitted in a symbol with 15 kHz SCS. If a one symbol PUCCH is configured for enhanced PUCCH format 0 or format 2 with 60 kHz SCS, it can be repeated 4 times to fit into a symbol with 15 kHz. Similarly, if a two symbol PUCCH is configured for enhanced PUCCH format 0 or format 2 with 60 kHz SCS, it can be repeated 2 times to fit into a symbol with 15 kHz., and so on.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH repetition as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 illustrates examples of subslot structures for URLLC PUCCH allocation. Examples of subslot indexes 204a-d for 14-symbol slots are shown.

Different subslot configurations 202 may be specified for NR. As shown in FIG. 2, potential subslot structures in a slot of 14 symbols may include one or more of the following. A first subslot configuration 202a includes seven 2-symbol subslots (i.e., 2,2,2,2,2,2,2). A second subslot configuration 202b includes {4,3,4,3}-symbol subslots. A third subslot configuration 202c includes {4,3,3,4}-symbol subslots. A fourth subslot configuration 202d includes {7,7}-symbol subslots.

In an example, for a structure of a 2-symbol subslot (e.g., the first subslot configuration 202a), there are potentially 7 subslots that can carry HARQ-ACK with PUCCH feedback.

However, in most cases, 2 to 4 HARQ-ACK feedback in a slot may be sufficient to satisfy the target low latency requirements.

Different subslot configurations may be configured for different numerologies with different subcarrier spacing (SCS) settings. For example, for SCS with 15 kilohertz (kHz), 2-symbol or 3 and 4 symbol subslots may be used to ensure more retransmissions occur within 1 millisecond (ms). For SCS with 60 kHz, 7-symbol subslots may be sufficient to ensure re-transmissions within 1 ms.

FIG. 3 illustrates examples of PUCCH resource configuration in each subslot. The subslot indexes 304a-b for 14-symbol slots are shown.

The same PUCCH configuration can be applied to all subslots, as shown in the first subslot configuration 302a of FIG. 3. The same PUCCH resource configuration may be applied in every subslot of the 2-symbol subslots.

In the case of the different duration for the subslots (e.g., in case of 3 and 4 symbol subslot structure of the second subslot configuration 302b), the same PUCCH configuration may be determined based on the subslot with shorter duration. For example, the same PUCCH resource configuration may be applied in every subslot based on the subslot with the shorter duration. In the case of the example of the second subslot configuration 302b, the 3-symbol subslot is the shorter duration.

FIG. 4 is a diagram illustrating examples of PUCCH repetition with a subslot structure. In particular, FIG. 4 illustrates examples with a 2-symbol subslot structure. A subslot index 404 of the 2-symbol subslot structure is shown. Examples of initial PUCCH transmissions 408 and PUCCH repetition transmissions 410 are illustrated. For example, FIG. 4 illustrates examples 406 of a 2-symbol PUCCH that may be repeated twice to achieve target reliability. The PUCCH repetition may provide more potential starting positions, and thus faster feedback.

Examples 412 of 4-symbol PUCCHs are also illustrated in FIG. 4. PUCCH resources may be configured at fewer fixed locations with a 4-symbol PUCCH to provide the same reliability. The PUCCH repetition transmissions 410 (of the 2-symbol PUCCHs, for example) may provide faster feedback with the same reliability as in a time domain non-overlapping PUCCH location case.

Figure 5:
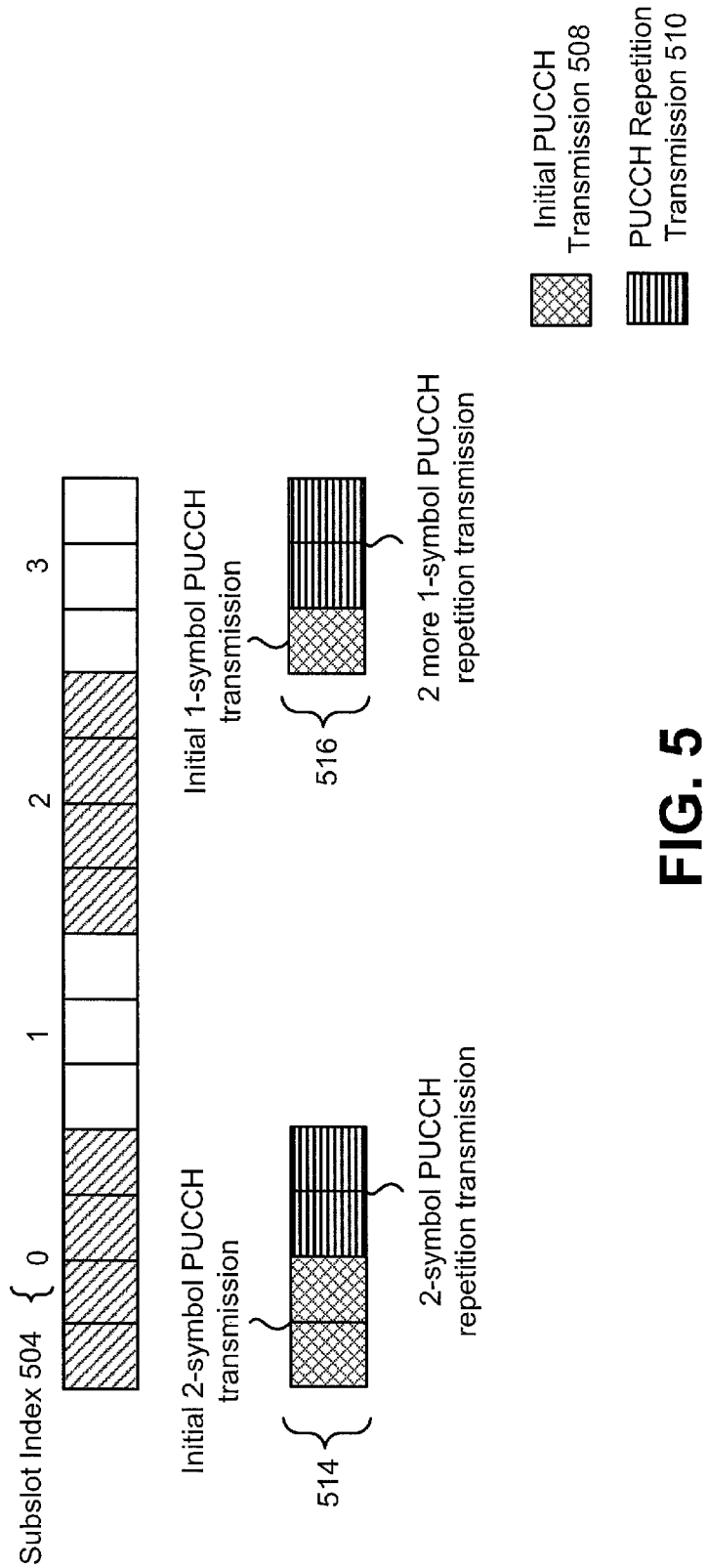
FIG. 5 is a diagram illustrating examples of PUCCH repetition with a subslot structure.

FIG. 5 is a diagram illustrating examples of PUCCH repetition with a subslot structure. In particular, FIG. 5 illustrates examples with a {4,3,4,3} symbol subslot structure. A subslot index 504 of the {4,3,4,3} symbol subslot structure is shown. Examples of initial PUCCH transmissions 508 and PUCCH repetition transmissions 510 are illustrated.

In some examples, PUCCH repetition may utilize all of the symbols (e.g., fully utilize the available symbols) in a subslot structure. For example in FIG. 5, with a 4 and 3 symbol subslot structure, a PUCCH with repetition can potentially use all available symbols in a subslot. In a 4-symbol subslot, to use all symbols, the UE can be configured with a 2-symbol PUCCH with 2 times transmission (e.g., an initial 2-symbol PUCCH transmission with a 2-symbol PUCCH repetition transmission as illustrated in the example 514), a 1-symbol PUCCH with 4 times transmission, or a 4-symbol PUCCH. In a 3-symbol subslot, the UE can be configured with a 1-symbol PUCCH and 3 times transmission (e.g., an initial 1-symbol PUCCH transmission with 2 1-symbol PUCCH repetition transmissions as illustrated in the example 516) to utilize all symbols in the subslot.

Figure 6:
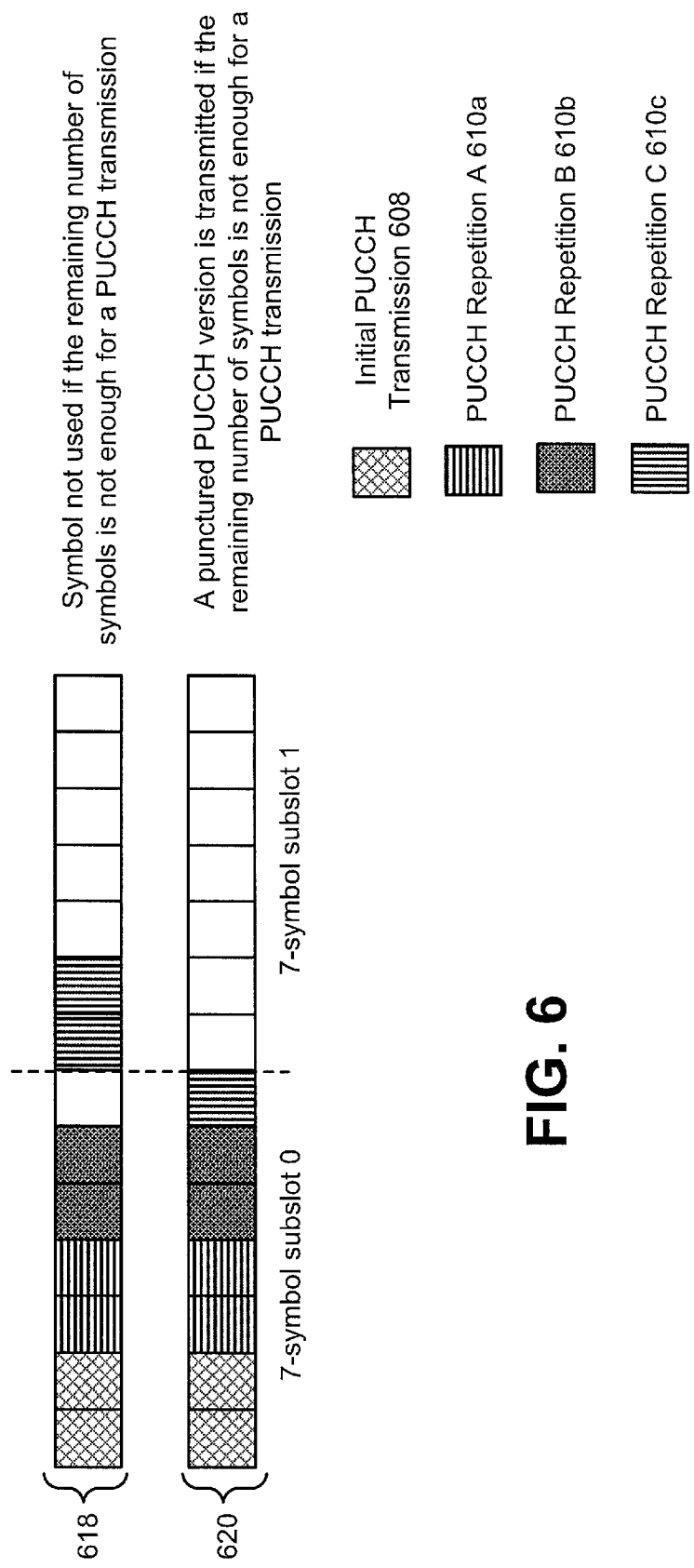
FIG. 6 is a diagram illustrating examples of approaches for PUCCH repetition in accordance with a first case.

FIG. 6 is a diagram illustrating examples of approaches for PUCCH repetition in accordance with a first case. In a first case, PUCCH repetition within a subslot is supported, but a PUCCH transmission across a subslot boundary may not be allowed. For example, if a subslot structure is configured and a PUCCH resource is configured in a subslot, PUCCH repetition may be performed within a subslot. In this case, more than one PUCCH transmissions may happen in a subslot.

In particular, FIG. 6 illustrates examples of approaches for PUCCH repetition within a subslot. In one approach, each PUCCH transmission may use the same configured PUCCH format and duration. Accordingly, no PUCCH may be transmitted if the remaining symbol in the subslot is less than the configured PUCCH duration, as illustrated in the first example 618 of FIG. 6. In particular, the first example illustrates that an initial PUCCH transmission 608 is performed in a first 7-symbol subslot (7-symbol subslot 0), followed by PUCCH repetition A 610a and PUCCH repetition B 610b. In this example, PUCCH repetition C 610c is performed in the second 7-symbol subslot (7-symbol subslot 1). A symbol is not used in the first 7-symbol subslot because the number of remaining symbols (e.g., 1) is not enough for a PUCCH transmission (e.g., PUCCH repetition). This approach may be beneficial because it simplifies the PUCCH configuration and may ensure the completeness of each PUCCH transmission.

In another approach, the last PUCCH transmission may use the configured PUCCH format with potential puncturing of symbols depending on the available symbols to the next subslot. As illustrated in the second example 620 of FIG. 6, an initial PUCCH transmission 608 is performed in a first 7-symbol subslot, followed by PUCCH repetition A 610a and PUCCH repetition B 610b. In this example, a punctured version of PUCCH repetition C 610c is transmitted because the number of remaining symbols in the first 7-symbol subslot is not enough for a PUCCH transmission (e.g., PUCCH repetition). A punctured PUCCH may not be able to provide target performance, especially if the remaining number of symbols is small compared to the initial PUCCH transmission. Accordingly, a punctured PUCCH transmission may not be beneficial in some examples of PUCCH repetition. In both approaches described in connection with FIG. 6, within a subslot, the number of repetitions may be limited by the duration of the subslot, the duration of the PUCCH transmission, and/or the starting symbol of the initial PUCCH transmission.

In some approaches, for PUCCH repetitions in a slot, the PUCCH repetition may be performed in a subslot first. If the remaining symbol(s) in the subslot is or are less than the configured PUCCH duration and the number of PUCCH repetitions is not reached yet, a PUCCH repetition may start from an earliest uplink symbol that satisfies a PUCCH format and duration in the next available subslot. If the number of PUCCH repetitions is not reached at the end of a slot, a PUCCH repetition may start from the earliest uplink symbol that satisfies a PUCCH format and duration in the next available subslot of the next available slot.

Figure 7:
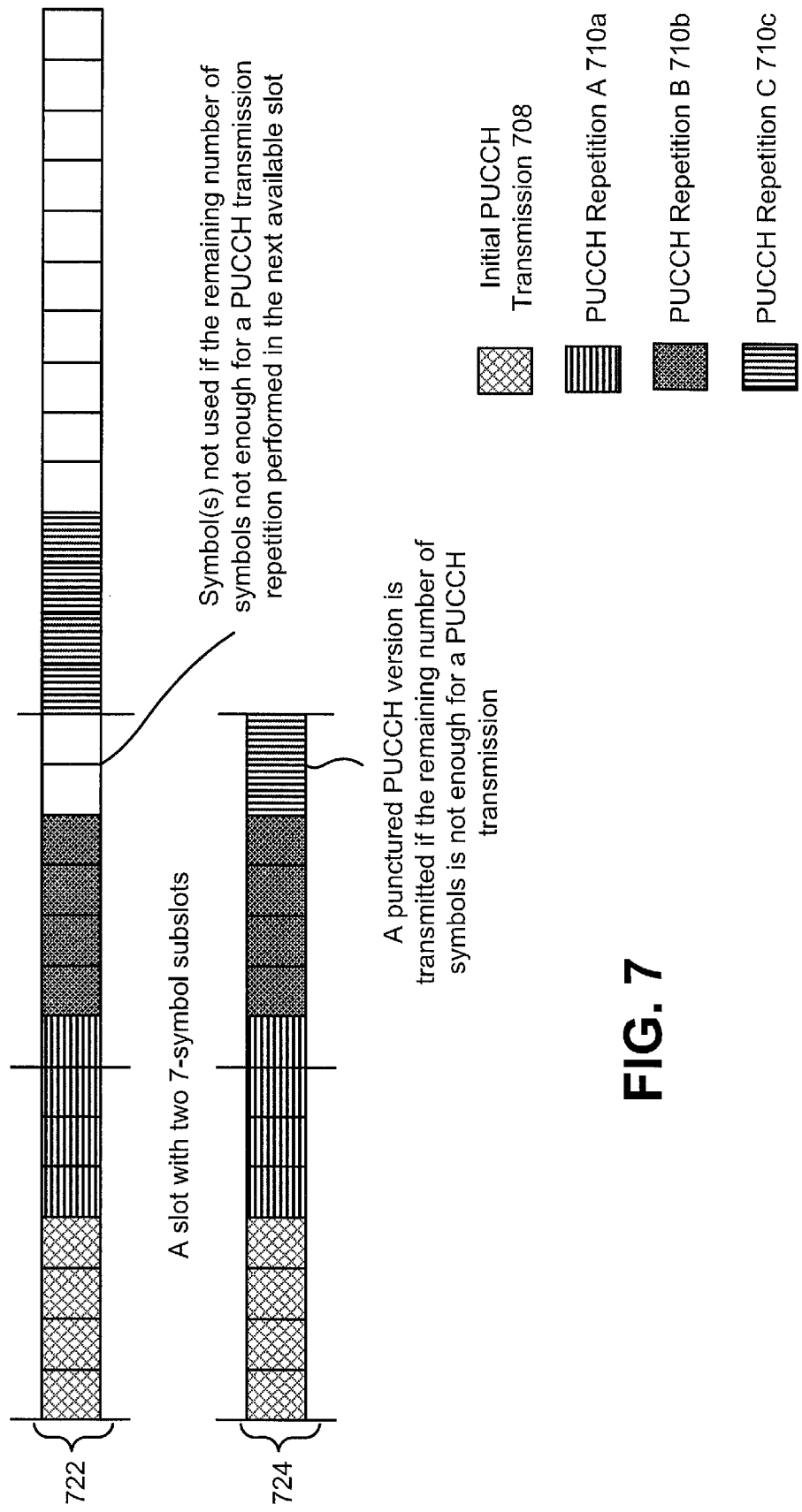
FIG. 7 is a diagram illustrating examples of approaches for PUCCH repetition in accordance with a second case.

FIG. 7 is a diagram illustrating examples of approaches for PUCCH repetition in accordance with a second case. In a second case, PUCCH repetition may cross a subslot boundary within a slot. For example, PUCCH repetition within a subslot may be supported. PUCCH transmission across a subslot boundary may be allowed within a slot, but PUCCH transmission across a slot boundary may not be supported. In the second case, PUCCH transmission across a subslot boundary may be allowed for PUCCH repetition.

In a second case, a PUCCH repetition at the end of a subslot may cross a subslot boundary and may extends to the next subslot that is within the same slot as the previous subslot, as shown in FIG. 7. PUCCH repetition may be performed within a slot using available uplink (UL) symbols regardless of subslot structure in the slot. This may achieve the same target as allowing PUCCH resources across subslot boundaries.

An example 722 of an approach is illustrated in FIG. 7 For instance, for PUCCH repetition within a slot, each PUCCH transmission may use the same configured PUCCH format and duration. No PUCCH may be transmitted if the remaining symbol(s) in a slot is or are less than the configured PUCCH duration, as illustrated in the example 722. In particular, the example 722 illustrates an initial PUCCH transmission 708 followed by PUCCH repetition A 710a and PUCCH repetition B 710 in a slot with two 7-symbol subslots. In the example 722, symbols are not used because the remaining number of symbols (or subslots) in the slot is not enough for a PUCCH transmission repetition performed in the next available slot. Accordingly, PUCCH repetition C 710c may be performed in the next slot.

In another approach, the last PUCCH transmission may use the configured PUCCH format with potential puncturing of symbols depending on the available symbols to the next configured starting symbol location or the end of the slot. In particular, an example 724 illustrates an initial PUCCH transmission 708 followed by PUCCH repetition A 710a, PUCCH repetition B 710, and a punctured version of PUCCH repetition C 710c, because the remaining number of symbols is not enough for a PUCCH transmission. A punctured PUCCH may not be able to provide target performance, particularly if the remaining number of symbols is too small compared to the initial PUCCH transmission. Accordingly, a punctured PUCCH transmission may not be beneficial in some examples of PUCCH repetition. In both approaches described in connection with FIG. 7, within a slot, the number of repetitions may be limited by the duration of the PUCCH transmission and/or the starting symbol of the initial PUCCH transmission.

Figure 8:
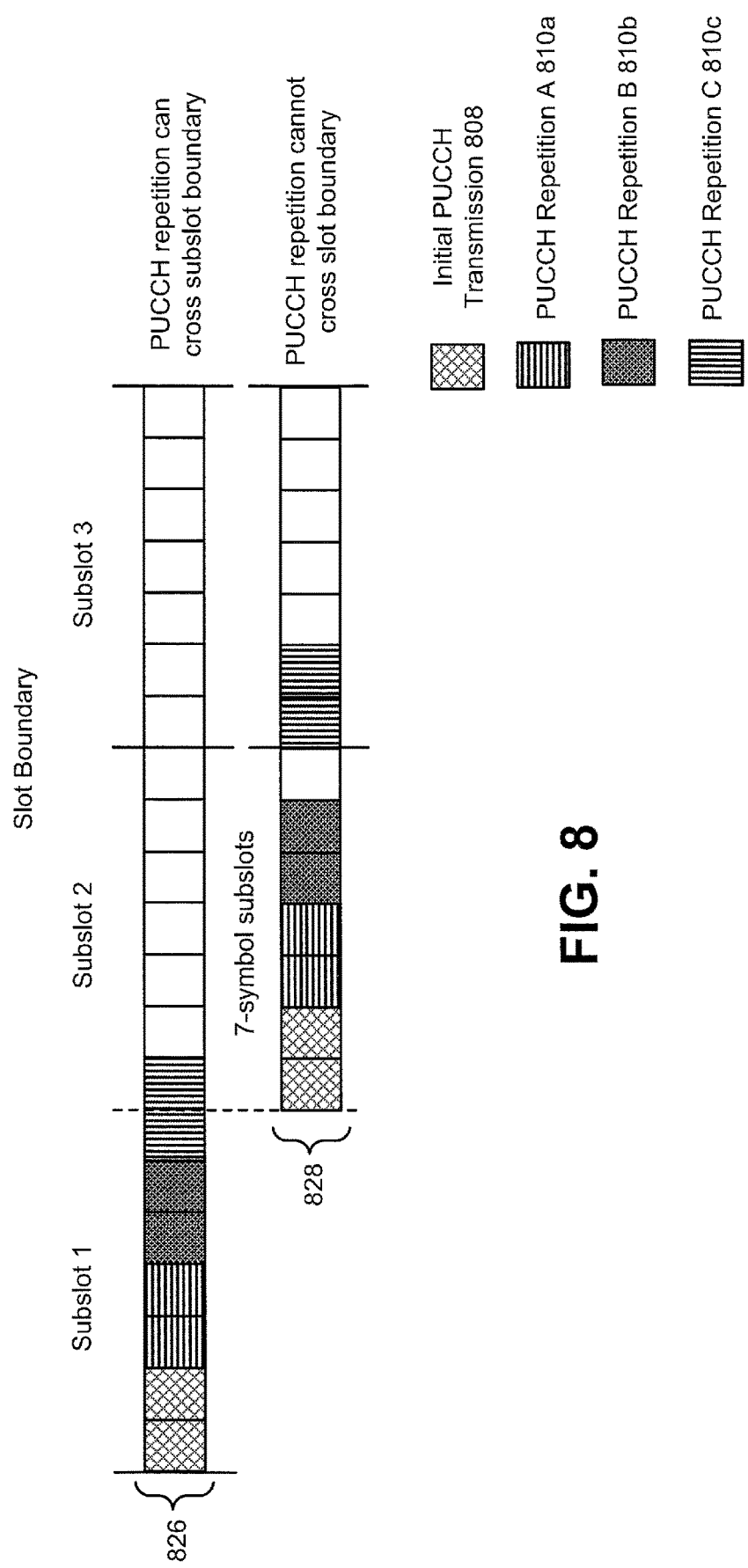
FIG. 8 is a diagram illustrating additional examples of approaches for PUCCH repetition in accordance with a second case.

FIG. 8 is a diagram illustrating additional examples of approaches for PUCCH repetition in accordance with a second case. In particular, FIG. 8 illustrates examples where PUCCH repetition may cross a subslot boundary but may not cross a slot boundary. For PUCCH repetitions within a slot, the PUCCH repetition may be performed in a subslot that allows cross-subslot PUCCH transmissions during PUCCH repetition. If a number of PUCCH repetitions is not reached at the end of a slot, a PUCCH repetition may start from the earliest uplink symbol that satisfies the configured PUCCH format and duration in the next available subslot of the next available slot. FIG. 8 shows two examples 826, 828 with 4 PUCCH transmissions (e.g., an initial PUCCH transmission 808, PUCCH repetition A 810a, PUCCH repetition B 810b, and PUCCH repetition C 810c). The starting position of the initial PUCCH transmissions 808 are different in a slot, and the resulting PUCCH repetitions are also different because a PUCCH repetition may cross a subslot boundary but may not cross a slot boundary. In one example 826, 7-symbol subslots include an initial PUCCH transmission 808, PUCCH repetition A 810a, PUCCH repetition B 810b, and PUCCH repetition C 810c, where PUCCH repetition C 810c crosses a subslot boundary. In another example 828, 7-symbol subslots include an initial PUCCH transmission 808, PUCCH repetition A 810a, PUCCH repetition B 810b, and PUCCH repetition C 810c, where PUCCH repetition C 810c is transmitted after a slot boundary.

Figure 9:
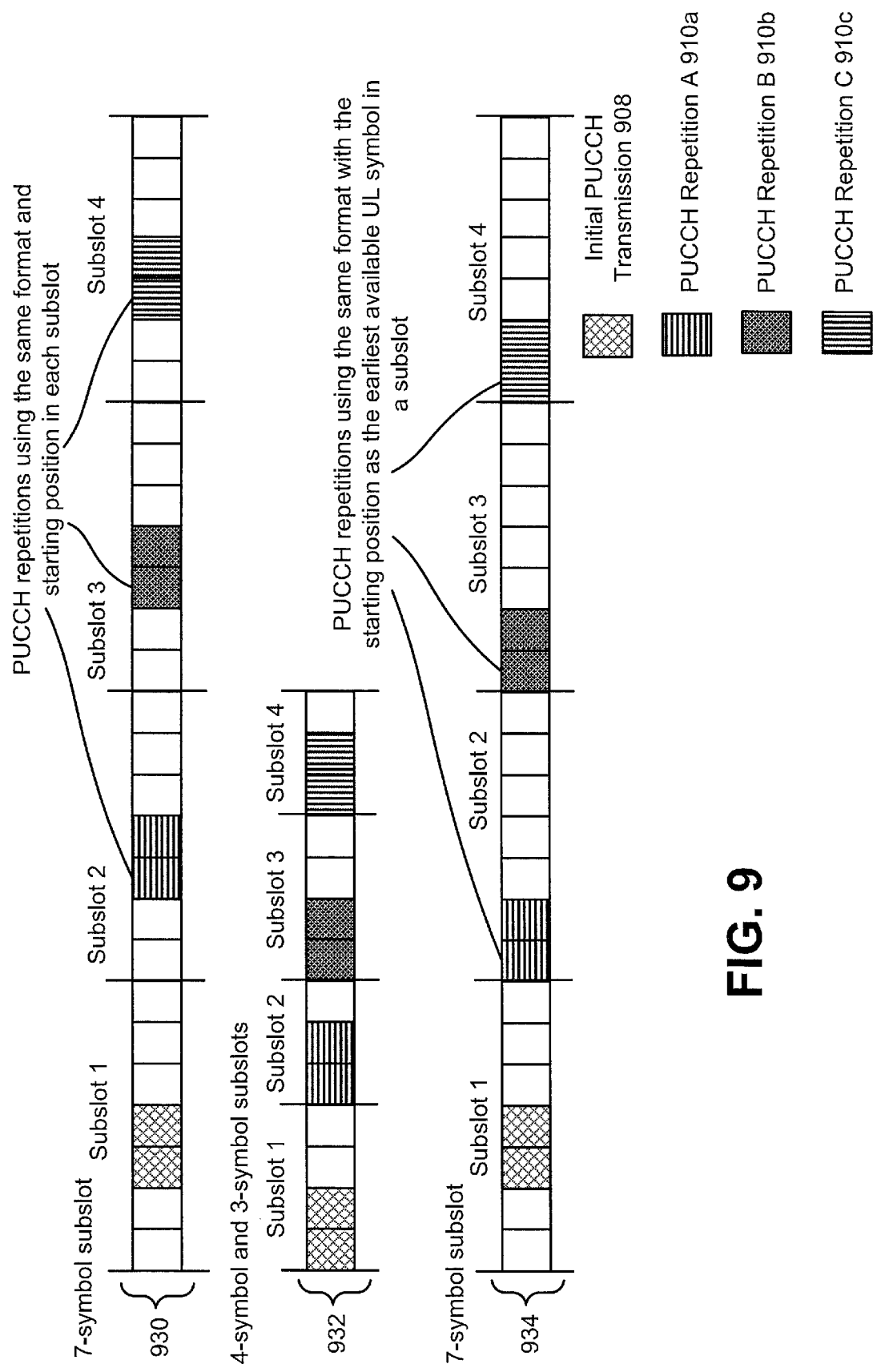
FIG. 9 is a diagram illustrating examples of approaches for PUCCH repetition in accordance with a third case.

FIG. 9 is a diagram illustrating examples of approaches for PUCCH repetition in accordance with a third case. The third case may include subslot-based PUCCH repetition with one PUCCH in each subslot. For example, one subslot-based PUCCH may be transmitted in a subslot, and PUCCH repetition may be performed by PUCCH transmissions in one or more subslots. For instance, a single PUCCH transmission may be allowed within a subslot, and multiple PUCCH transmissions may be performed in multiple subslots, with one PUCCH transmission in each subslot.

In one approach, if the PUCCH is configured with a subslot structure, a PUCCH repetition transmission may use the same PUCCH format with the same duration and the same starting symbol location in each subslot as the initial PUCCH transmission. Thus, an approach may support subslot-level PUCCH repetition. In some examples, this approach may be beneficial if the subslot duration is relatively short (e.g., in a 2-symbol subslot structure). In some examples of this approach, PUCCH repetition within a subslot may not be performed.

Two examples 930, 932 of PUCCH repetitions using the same PUCCH format, duration and starting position in each subslot are illustrated in FIG. 9. In particular, one example 930 illustrates 7-symbol subslots, with an initial PUCCH transmission 908 in subslot 1. PUCCH repetition A 910a is performed in subslot 2, PUCCH repetition B 910b is performed in subslot 3, and PUCCH repetition C 910c is performed in subslot 4, where each of the PUCCH repetitions 910a-c use the same format and same starting position in each of the subslots. Another example 932 illustrates 4-symbol and 3-symbol subslots, with an initial PUCCH transmission 908 in subslot 1. PUCCH repetition A 910a is performed in subslot 2, PUCCH repetition B 910b is performed in subslot 3, and PUCCH repetition C 910c is performed in subslot 4, where each of the PUCCH repetitions 910a-c use the same format and same starting position in each of the subslots.

In another approach, if the PUCCH is configured with a subslot structure, a PUCCH repetition transmission may use the same PUCCH format with the same duration in each subslot as the initial PUCCH transmission. In this approach, the starting position of a PUCCH repetition in later subslots may be different. For example, the earliest available UL symbol that fits the configured PUCCH format and duration can be used as the starting position, as shown in an example 934 illustrated in FIG. 9.

In some examples, PUCCH repetition can be applied to both short PUCCH format 0 and format 2, and long PUCCH format 1, format 3, and format 4. In a case of subslot-based PUCCH allocation and transmission, the supported PUCCH formats may depend on the subslot configuration (e.g., the duration of each subslot).

Figure 10:
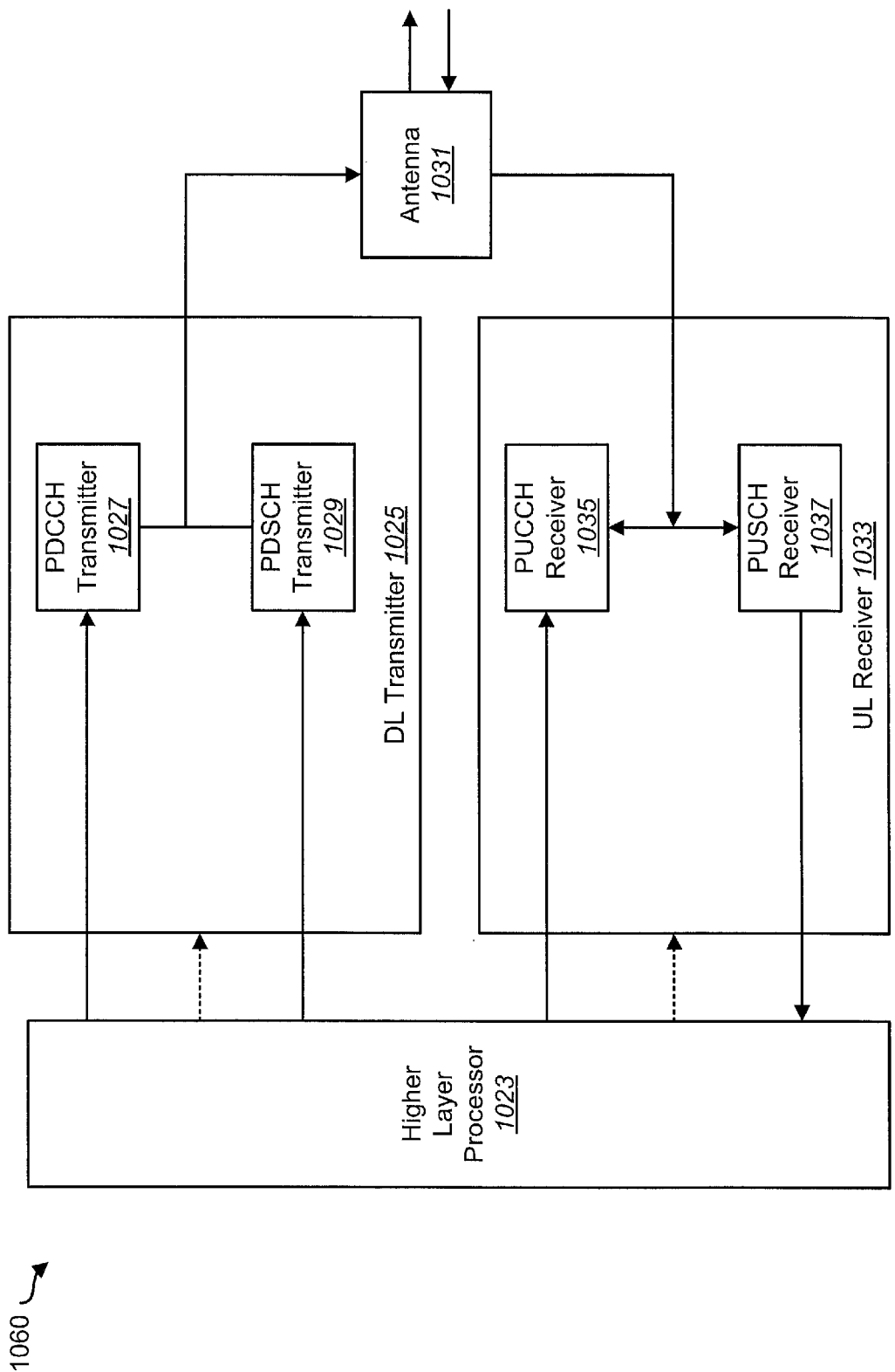
FIG. 10 is a block diagram illustrating one implementation of a gNB.

FIG. 10 is a block diagram illustrating one implementation of a gNB 1060. The gNB 1060 may be implemented in accordance with the gNB 160 described in connection with FIG. 1 in some examples, and/or may perform one or more of the functions described herein. The gNB 1060 may include a higher layer processor 1023, a DL transmitter 1025, a UL receiver 1033, and one or more antenna 1031. The DL transmitter 1025 may include a PDCCH transmitter 1027 and a PDSCH transmitter 1029. The UL receiver 1033 may include a PUCCH receiver 1035 and a PUSCH receiver 1037.

The higher layer processor 1023 may manage physical layer's behaviors (the DL transmitter's and the UL receiver's behaviors) and provide higher layer parameters to the physical layer. The higher layer processor 1023 may obtain transport blocks from the physical layer. The higher layer processor 1023 may send/acquire higher layer messages such as an RRC message and MAC message to/from a UE's higher layer. The higher layer processor 1023 may provide the PDSCH transmitter transport blocks and provide the PDCCH transmitter transmission parameters related to the transport blocks.

The DL transmitter 1025 may multiplex downlink physical channels and downlink physical signals (including reservation signal) and transmit them via transmission antennas 1031. The UL receiver 1033 may receive multiplexed uplink physical channels and uplink physical signals via receiving antennas 1031 and de-multiplex them. The PUCCH receiver 1035 may provide the higher layer processor 1023 UCI. The PUSCH receiver 1037 may provide the higher layer processor 1023 received transport blocks.

Figure 11:
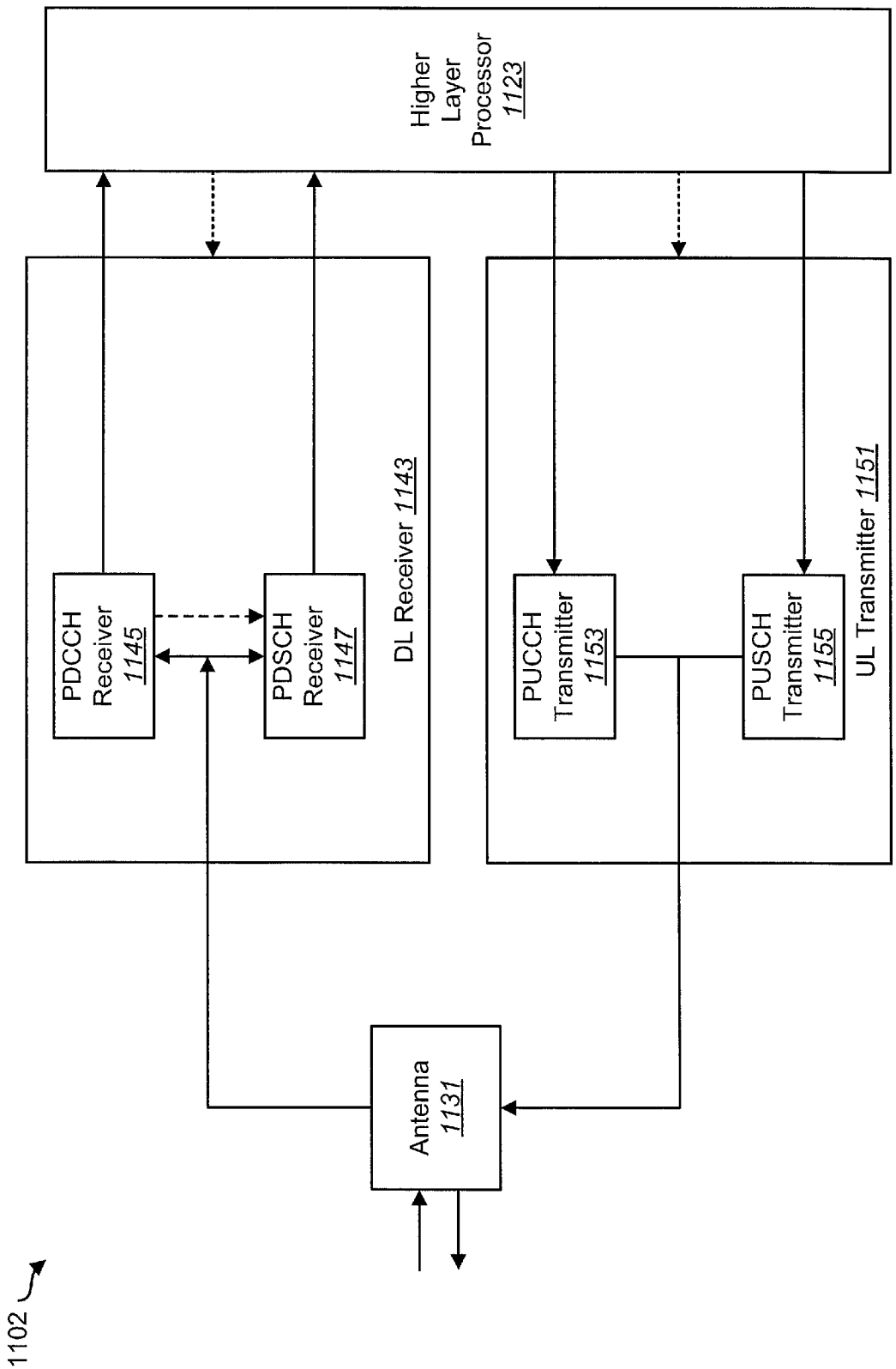
FIG. 11 is a block diagram illustrating one implementation of a UE.

FIG. 11 is a block diagram illustrating one implementation of a UE 1102. The UE 1102 may be implemented in accordance with the UE 102 described in connection with FIG. 1 in some examples, and/or may perform one or more of the functions described herein. The UE 1102 may include a higher layer processor 1123, a UL transmitter 1151, a DL receiver 1143, and one or more antenna 1131. The UL transmitter 1151 may include a PUCCH transmitter 1153 and a PUSCH transmitter 1155. The DL receiver 1143 may include a PDCCH receiver 1145 and a PDSCH receiver 1147.

The higher layer processor 1123 may manage physical layer's behaviors (the UL transmitter's and the DL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PUSCH transmitter transport blocks and provide the PUCCH transmitter 1153 UCI.

The DL receiver 1143 may receive multiplexed downlink physical channels and downlink physical signals via receiving antennas 1131 and de-multiplex them. The PDCCH receiver 1145 may provide the higher layer processor 1123 DCI. The PDSCH receiver 1147 may provide the higher layer processor 1123 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 12:
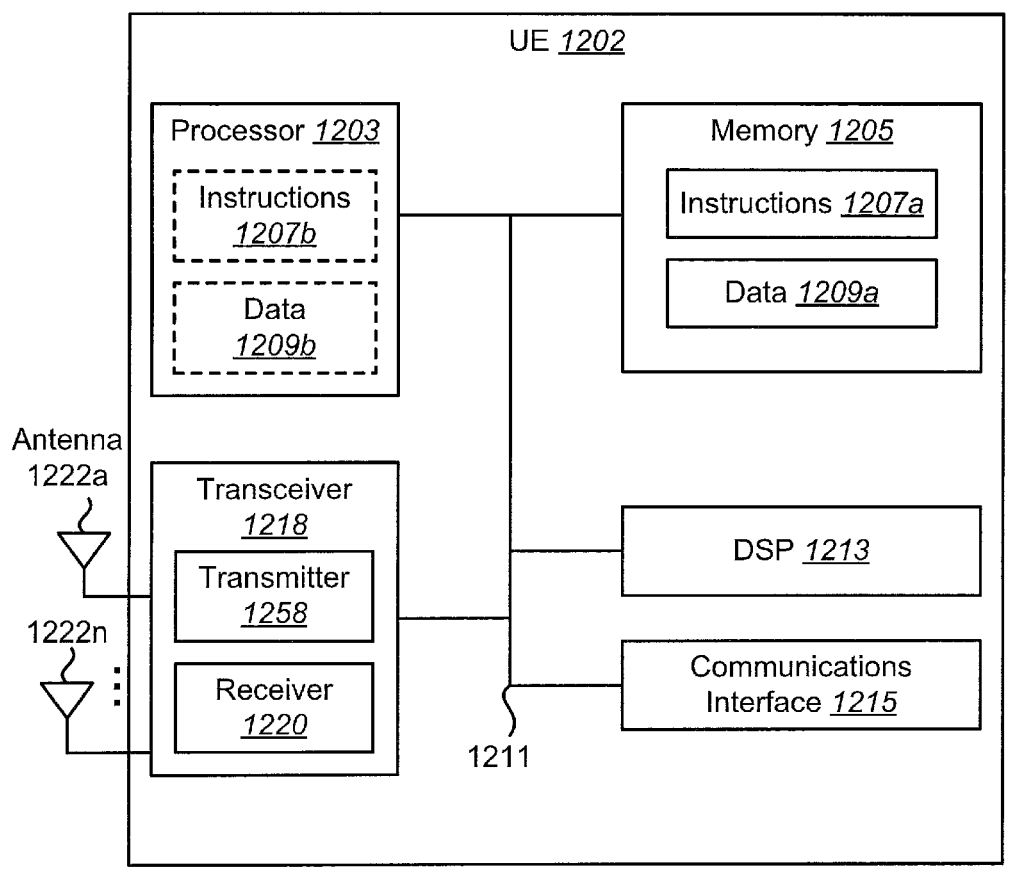
FIG. 12 illustrates various components that may be utilized in a UE.

FIG. 12 illustrates various components that may be utilized in a UE 1202. The UE 1202 described in connection with FIG. 12 may be implemented in accordance with the UE 102 described in connection with FIG. 1. The UE 1202 includes a processor 1203 that controls operation of the UE 1202. The processor 1203 may also be referred to as a central processing unit (CPU). Memory 1205, which may include read-only memory (ROM), random access memory (RAM), a combination of the two or any type of device that may store information, provides instructions 1207a and data 1209a to the processor 1203. A portion of the memory 1205 may also include non-volatile random-access memory (NVRAM). Instructions 1207b and data 1209b may also reside in the processor 1203. Instructions 1207b and/or data 1209b loaded into the processor 1203 may also include instructions 1207a and/or data 1209a from memory 1205 that were loaded for execution or processing by the processor 1203. The instructions 1207b may be executed by the processor 1203 to implement the methods described above.

The UE 1202 may also include a housing that contains one or more transmitters 1258 and one or more receivers 1220 to allow transmission and reception of data. The transmitter(s) 1258 and receiver(s) 1220 may be combined into one or more transceivers 1218. One or more antennas 1222a-n are attached to the housing and electrically coupled to the transceiver 1218.

The various components of the UE 1202 are coupled together by a bus system 1211, which may include a power bus, a control signal bus, and a status signal bus, in addition to a data bus. However, for the sake of clarity, the various buses are illustrated in FIG. 12 as the bus system 1211. The UE 1202 may also include a digital signal processor (DSP) 1213 for use in processing signals. The UE 1202 may also include a communications interface 1215 that provides user access to the functions of the UE 1202. The UE 1202 illustrated in FIG. 12 is a functional block diagram rather than a listing of specific components.

Figure 13:
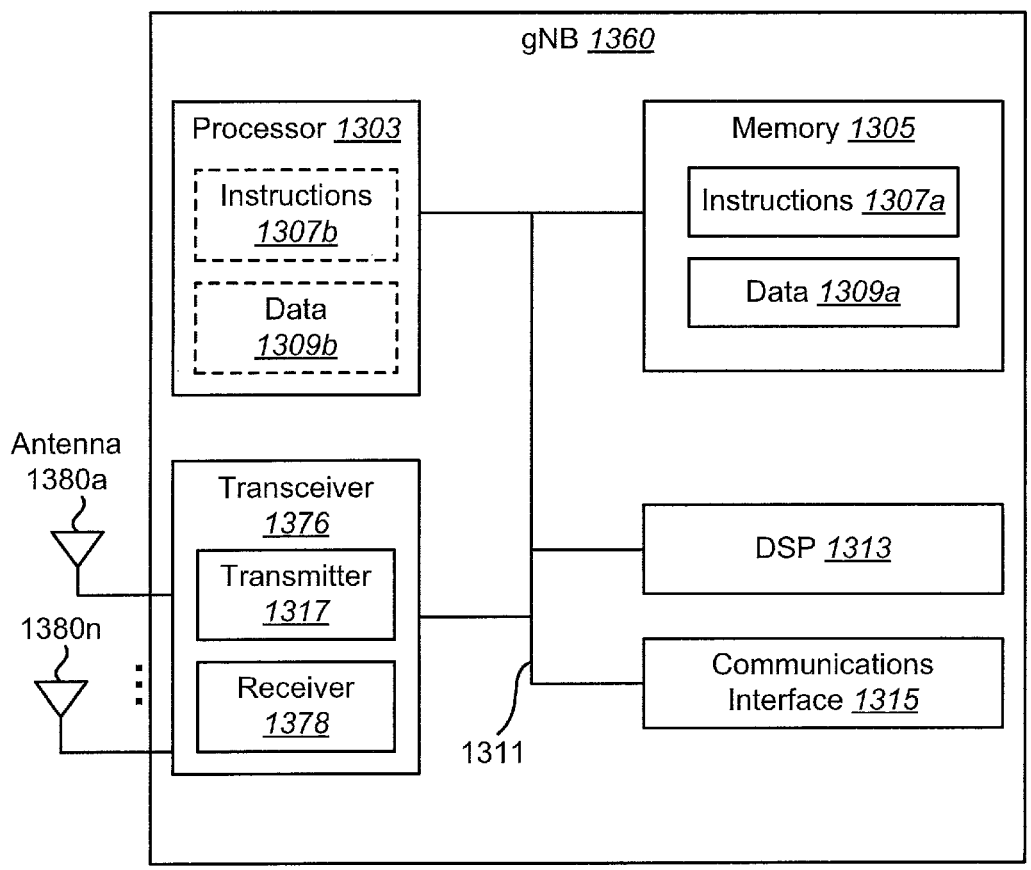
FIG. 13 illustrates various components that may be utilized in a gNB.

FIG. 13 illustrates various components that may be utilized in a gNB 1360. The gNB 1360 described in connection with FIG. 13 may be implemented in accordance with the gNB 160 described in connection with FIG. 1. The gNB 1360 includes a processor 1303 that controls operation of the gNB 1360. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The gNB 1360 may also include a housing that contains one or more transmitters 1317 and one or more receivers 1378 to allow transmission and reception of data. The transmitter(s) 1317 and receiver(s) 1378 may be combined into one or more transceivers 1376. One or more antennas 1380a-n are attached to the housing and electrically coupled to the transceiver 1376.

The various components of the gNB 1360 are coupled together by a bus system 1311, which may include a power bus, a control signal bus, and a status signal bus, in addition to a data bus. However, for the sake of clarity, the various buses are illustrated in FIG. 13 as the bus system 1311. The gNB 1360 may also include a digital signal processor (DSP) 1313 for use in processing signals. The gNB 1360 may also include a communications interface 1315 that provides user access to the functions of the gNB 1360. The gNB 1360 illustrated in FIG. 13 is a functional block diagram rather than a listing of specific components.

Figure 14:
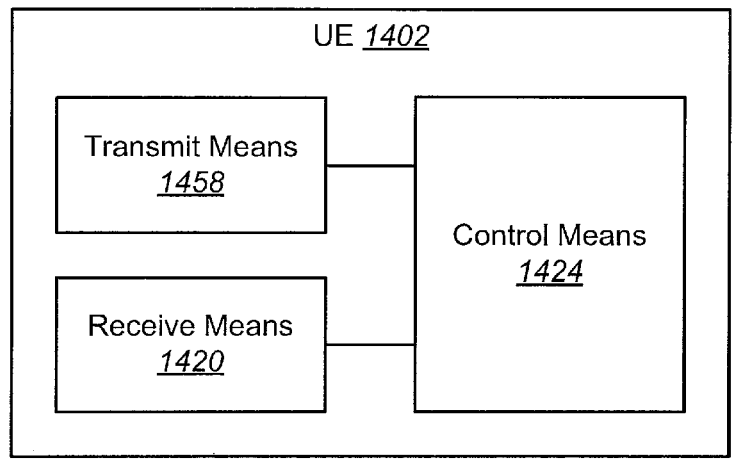
FIG. 14 is a block diagram illustrating one implementation of a UE in which systems and methods for PUCCH repetition may be implemented.

FIG. 14 is a block diagram illustrating one implementation of a UE 1402 in which systems and methods for PUCCH repetition may be implemented. The UE 1402 includes transmit means 1458, receive means 1420 and control means 1424. The transmit means 1458, receive means 1420 and control means 1424 may be configured to perform one or more of the functions described in connection with FIG. 1 above. FIG. 12 above illustrates one example of a concrete apparatus structure of FIG. 14. Other various structures may be implemented to realize one or more of the functions of FIG. 1. For example, a DSP may be realized by software.

Figure 15:
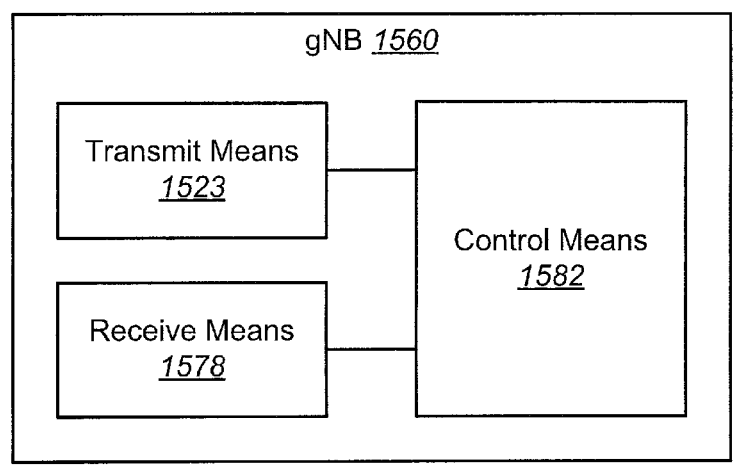
FIG. 15 is a block diagram illustrating one implementation of a gNB in which systems and methods for PUCCH repetition may be implemented.

FIG. 15 is a block diagram illustrating one implementation of a gNB 1560 in which systems and methods for PUCCH repetition may be implemented. The gNB 1560 includes transmit means 1523, receive means 1578 and control means 1582. The transmit means 1523, receive means 1578 and control means 1582 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is nontransitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor.

Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE), comprising:
a processor configured to determine a subslot structure for physical uplink control channel (PUCCH) repetition; and
transmitting circuitry configured to transmit the PUCCH repetition based on the subslot structure,
wherein the PUCCH repetition is configured for time domain,
PUCCH repetition within a subslot is not supported and one subslot-based PUCCH transmission is transmitted in a subslot, and
the PUCCH repetition is performed by PUCCH transmission in multiple subslots.

2. The UE of claim 1, wherein the PUCCH repetition is configured for format 0, format 2, format 1, format 3, or format 4.

3. The UE of claim 1, wherein if a subslot-based PUCCH repetition is scheduled to collide with another PUCCH in a subslot, the processor is further configured to determine an uplink control information (UCI) priority, wherein a PUCCH carrying a first UCI with a higher priority is transmitted and the other PUCCH is dropped.

4. The UE of claim 1, wherein if a subslot-based PUCCH repetition is scheduled to collide with another PUCCH in a subslot with a same uplink control information (UCI) priority, a PUCCH that starts earlier is transmitted and the other PUCCH is dropped.

5. A base station (gNB), comprising:
a processor configured to determine a subslot structure for physical uplink control channel (PUCCH) repetition; and
receiving circuitry configured to receive the PUCCH repetition based on the subslot structure,
wherein the PUCCH repetition is configured for time domain,
PUCCH repetition within a subslot is not supported and one subslot-based PUCCH transmission is transmitted in a subslot, and
the PUCCH repetition is performed by PUCCH transmission in multiple subslots.

6. The gNB of claim 5, wherein the PUCCH repetition is configured for format 0, format 2, format 1, format 3, or format 4.

7. The gNB of claim 5, wherein if a subslot-based PUCCH repetition is scheduled to collide with another PUCCH in a subslot, the processor is further configured to determine an uplink control information (UCI) priority, wherein a PUCCH carrying a first UCI with a higher priority is transmitted and the other PUCCH is dropped.

8. The gNB of claim 5, wherein if a subslot-based PUCCH repetition is scheduled to collide with another PUCCH in a subslot with a same uplink control information (UCI) priority, a PUCCH that starts earlier is transmitted and the other PUCCH is dropped.

9. A method performed by a user equipment (UE), comprising:
determining a subslot structure for physical uplink control channel (PUCCH) repetition; and
transmitting the PUCCH repetition based on the subslot structure,
wherein the PUCCH repetition is configured for time domain,
PUCCH repetition within a subslot is not supported and one subslot-based PUCCH transmission is transmitted in a subslot, and
the PUCCH repetition is performed by PUCCH transmission in multiple subslots.

* * * * *